(12) United States Patent
Robertsson et al.

(10) Patent No.: US 7,961,551 B2
(45) Date of Patent: Jun. 14, 2011

(54) DETERMINING DIRECTIONAL PROPAGATION ATTRIBUTES OF A SEISMIC EVENT

(75) Inventors: Johan Robertsson, Grantchester (GB); Dirk-Jan Van Manen, Reigate (GB); Susanne Rentsch, Brighton (GB)

(73) Assignee: WesternGeco L.L.C., Houston, TX (US)

( * ) Notice: Subject to any disclaimer, the term of this patent is extended or adjusted under 35 U.S.C. 154(b) by 587 days.

(21) Appl. No.: 12/052,867

(22) Filed: Mar. 21, 2008

(65) Prior Publication Data

US 2009/0238036 A1 Sep. 24, 2009

(51) Int. Cl.
*G01H 9/00* (2006.01)
(52) U.S. Cl. .......................................... 367/149; 367/21
(58) Field of Classification Search .................. 367/149, 367/21
See application file for complete search history.

(56) References Cited

U.S. PATENT DOCUMENTS

| | | | | |
|---|---|---|---|---|
| 4,547,869 | A | * | 10/1985 | Savit ............................. 367/149 |
| 4,648,082 | A | * | 3/1987 | Savit ............................. 367/149 |
| 6,205,403 | B1 | | 3/2001 | Gaiser et al. |
| 2005/0038606 | A1 | | 2/2005 | Gilmer et al. |
| 2007/0153628 | A1 | | 7/2007 | Mathiszik et al. |

FOREIGN PATENT DOCUMENTS

EP 0175026 B1 2/1990

OTHER PUBLICATIONS

Bogert, et al., The Quenfrency Alanysis of Time Series for Echoes: Cepstrum, Pseudo-Autocovariance, Cross-Cepstrum, and Saphe Cracking, Proceedings of the Symposium on Time Series Analysis, Bell Telephone Laboratories and Princeton University, 1963, pp. 209-243, Chapter 15, 209-243. New York.
Hall, Matthew, Predicting Bed Thickness with Cepstral Decomposition, The Leading Edge, 2006, pp. 199-204, vol. 25.
Jurkevics, Andy, Polarization Analysis of Three-Component Array Data, Bulletin of the Seismological Society of America, 1988, pp. 1725-1743, vol. 78 No. 5.
Robertsson, et al. Rough-Sea Deghosting using a Single Streamer and a Pressure Gradient Approximation, Geophysics, 2002, pp. 2005-2011, vol. 67.
Vidale, J.E., Complex Polarization Analysis of Particle Motion, Bulletin of the Seismological Society of America, 1886, pp. 1393-1405, vol. 76, No. 5.
PCT Search Report, dated Oct. 27, 2009, Application No. PCT/US2009/037799.

\* cited by examiner

*Primary Examiner* — Mark Hellner

(57) ABSTRACT

A technique includes obtaining seismic data acquired by at least one seismic sensor. The technique includes processing the seismic data to determine a value that is indicative of a three-dimensional directional propagation attribute of a seismic event based on the seismic data.

29 Claims, 12 Drawing Sheets

DETERMINING DIRECTIONAL PROPAGATION ATTRIBUTES OF A SEISMIC EVENT

BACKGROUND

The invention generally relates to determining directional propagation attributes of a seismic event.

Seismic exploration involves surveying subterranean geological formations for hydrocarbon deposits. A survey typically involves deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones), and industrial surveys may deploy only one type of sensors or both. In response to the detected seismic events, the sensors generate electrical signals to produce seismic data. Analysis of the seismic data can then indicate the presence or absence of probable locations of hydrocarbon deposits.

Some surveys are known as "marine" surveys because they are conducted in marine environments. However, "marine" surveys may be conducted not only in saltwater environments, but also in fresh and brackish waters. In one type of marine survey, called a "towed-array" survey, an array of seismic sensor-containing streamers and sources is towed behind a survey vessel.

SUMMARY

In an embodiment of the invention, a technique includes obtaining seismic data acquired by at least one seismic sensor. The technique includes processing the seismic data to determine a value indicative of a three-dimensional directional propagation attribute of a seismic event based on the seismic data.

In another embodiment of the invention, an article includes a computer readable storage medium to store instructions that when executed by a processor-based system cause the processor based system to receive seismic data acquired by at least one seismic sensor and process the seismic data to determine a value indicative of a three-dimensional directional propagation attribute of a seismic event based on the seismic data.

In another embodiment of the invention, a system includes an interface and a processor. The interface receives seismic data acquired by at least one seismic sensor. The processor processes the seismic data to determine a value indicative of a three-dimensional directional propagation attribute of a seismic event based on the seismic data.

Advantages and other features of the invention will become apparent from the following drawing, description and claims.

DETAILED DESCRIPTION

Figure 1:
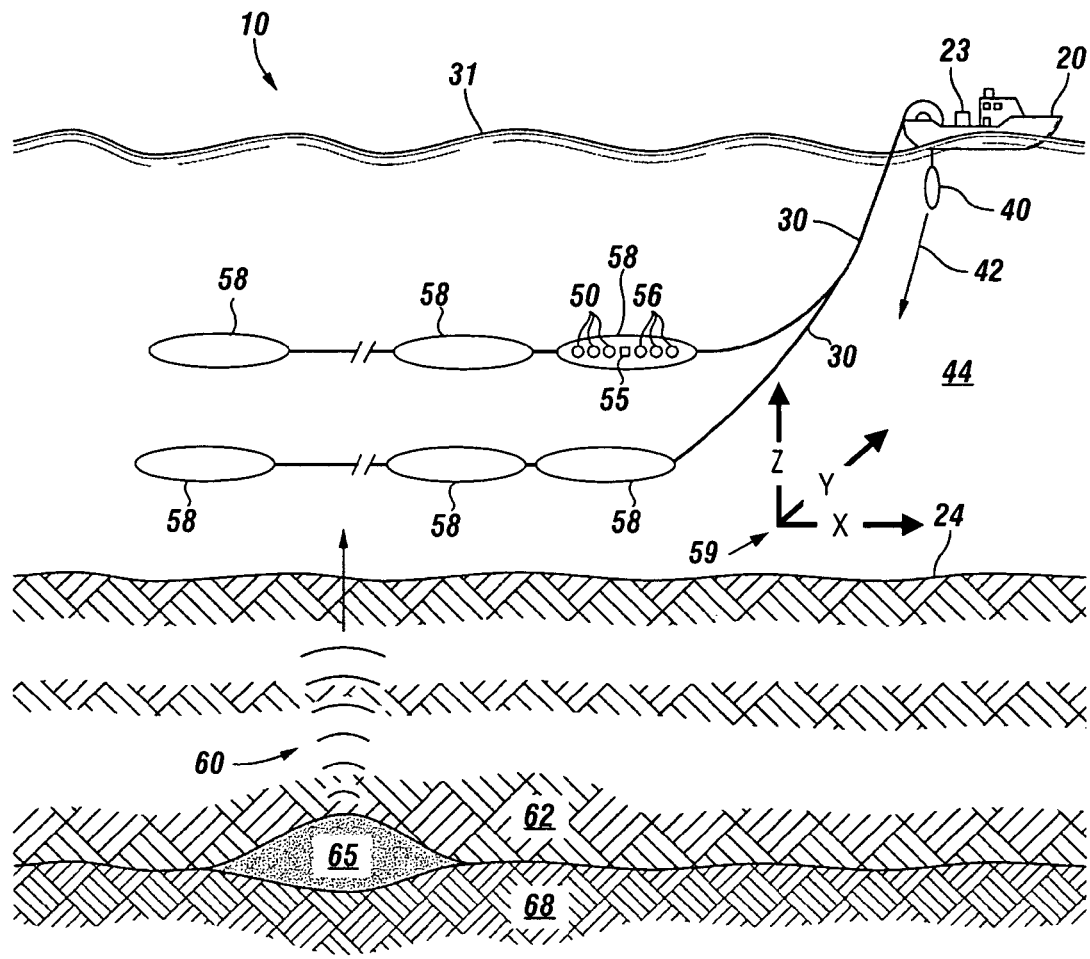
FIG. 1 is a schematic diagram of a marine acquisition system according to an embodiment of the invention.

FIG. 1 depicts an embodiment 10 of a marine seismic data acquisition system in accordance with some embodiments of the invention. In the system 10, a survey vessel 20 tows one or more seismic streamers 30 behind the vessel 20. It is noted that the streamers 30 may be arranged in a number of different geometries, depending on the particular embodiment of the invention. For the streamer spread that is depicted in FIG. 1, the spread is an over/under spread that includes an array of one or more streamers that is towed above another array of one or more streamers 30. However, the streamers 30 may be arranged in various other geometries (such as a geometry in which the streamers 30 are generally towed in the same horizontal plane, for example), depending on the particular embodiment of the invention.

The seismic streamers 30 may be several thousand meters long and may contain various support cables (not shown), as well as wiring and/or circuitry (not shown) that may be used to support communication along the streamers 30. In general, each streamer 30 includes a primary cable into which is mounted seismic sensors that record seismic signals.

In accordance with embodiments of the invention, the seismic sensors are multi-component seismic sensors 58, each of which is capable of detecting a pressure wavefield and at least one component of a particle motion that is associated with acoustic signals that are proximate to the multi-component seismic sensor 58. Examples of particle motions include one or more components of a particle displacement, one or more components (inline (x), crossline (y) and vertical (z) components (see axes 59, for example)) of a particle velocity and one or more components of a particle acceleration.

Depending on the particular embodiment of the invention, the multi-component seismic sensor 58 may include one or more hydrophones, geophones, particle displacement sensors, particle velocity sensors, accelerometers, pressure gradient sensors, or combinations thereof.

For example, in accordance with some embodiments of the invention, a particular multi-component seismic sensor 58 may include a hydrophone 55 for measuring pressure and three orthogonally-aligned accelerometers 50 to measure three corresponding orthogonal components of particle velocity and/or acceleration near the seismic sensor 58. It is noted that the multi-component seismic sensor 58 may be implemented as a single device (as depicted in FIG. 1) or may be implemented as a plurality of devices, depending on the particular embodiment of the invention. A particular multi-component seismic sensor 58 may also include pressure gradient sensors 56, which constitute another type of particle motion sensors. Each pressure gradient sensor measures the change in the pressure wavefield at a particular point with respect to a particular direction. For example, one of the pressure gradient sensors 56 may acquire seismic data indicative of, at a particular point, the partial derivative of the pressure wavefield with respect to the crossline direction, and another one of the pressure gradient sensors may acquire, a particular point, seismic data indicative of the pressure data with respect to the inline direction.

The marine seismic data acquisition system 10 includes one or more seismic sources 40 (one exemplary source 40 being depicted in FIG. 1), such as air guns and the like. In some embodiments of the invention, the seismic sources 40 may be coupled to, or towed by, the survey vessel 20. Alternatively, in other embodiments of the invention, the seismic sources 40 may operate independently of the survey vessel 20, in that the sources 40 may be coupled to other vessels or buoys, as just a few examples.

As the seismic streamers 30 are towed behind the survey vessel 20, acoustic signals 42 (an exemplary acoustic signal 42 being depicted in FIG. 1), often referred to as "shots," are produced by the seismic sources 40 and are directed down through a water column 44 into strata 62 and 68 beneath a water bottom surface 24. The acoustic signals 42 are reflected from the various subterranean geological formations, such as an exemplary formation 65 that is depicted in FIG. 1.

The incident acoustic signals 42 that are acquired by the sources 40 produce corresponding reflected acoustic signals, or pressure waves 60, which are sensed by the multi-component seismic sensors 58. It is noted that the pressure waves that are received and sensed by the multi-component seismic sensors 58 include "up going" pressure waves that propagate to the sensors 58 without reflection, as well as "down going" pressure waves that are produced by reflections of the pressure waves 60 from an air-water boundary 31.

The multi-component seismic sensors 58 generate signals (digital signals, for example), called "traces," which indicate the acquired measurements of the pressure wavefield and particle motion. The traces are recorded and may be at least partially processed by a signal processing unit 23 that is deployed on the survey vessel 20, in accordance with some embodiments of the invention. For example, a particular multi-component seismic sensor 58 may provide a trace, which corresponds to a measure of a pressure wavefield by its hydrophone 55; and the sensor 58 may provide one or more traces that correspond to one or more components of particle motion, which are measured by its accelerometers 50.

Figure 12:
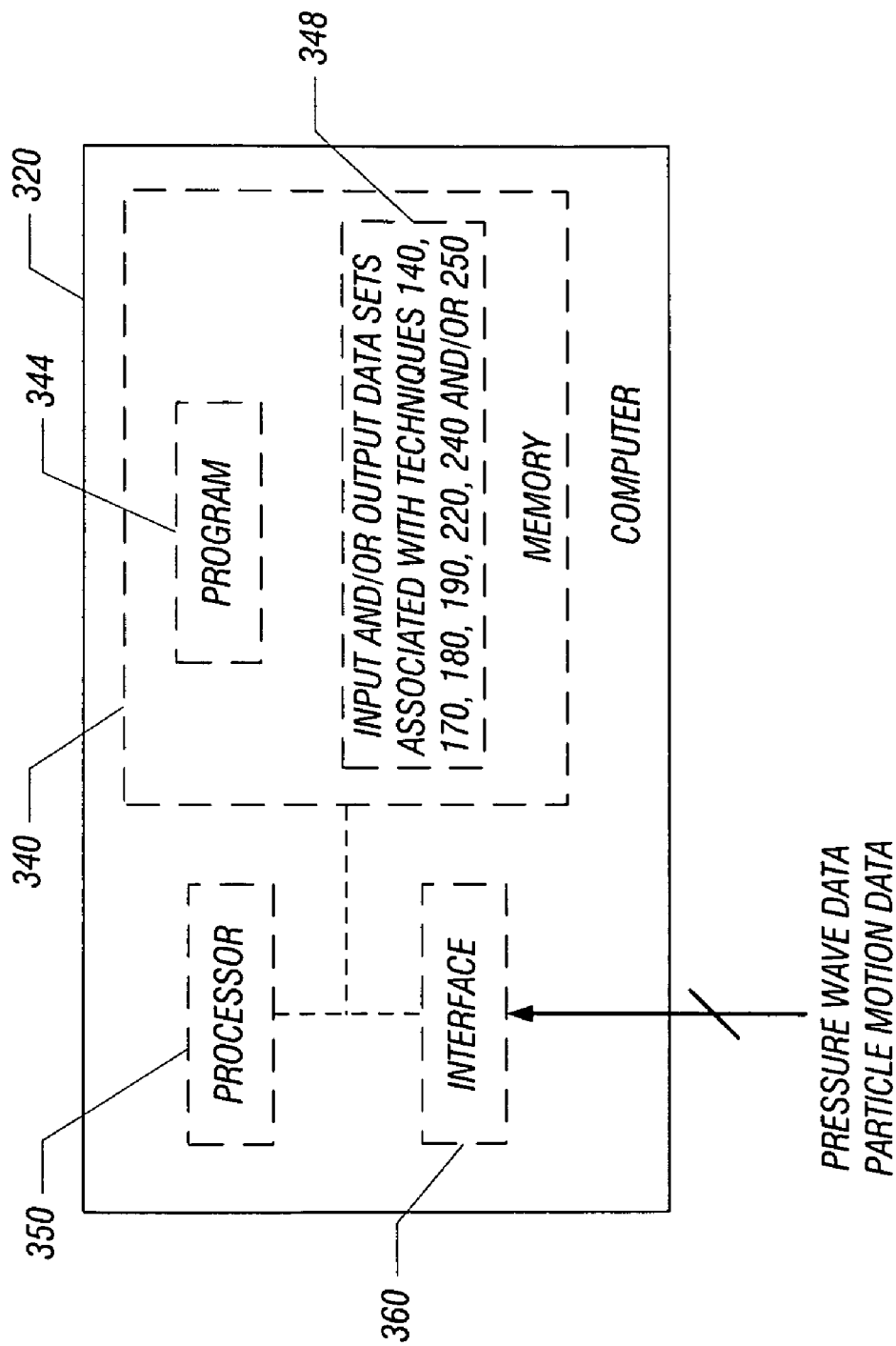
FIG. 12 is a schematic diagram of a seismic data processing system according to an embodiment of the invention.

The goal of the seismic acquisition is to build up an image of a survey area for purposes of identifying subterranean geological formations, such as the exemplary geological formation 65. Subsequent analysis of the representation may reveal probable locations of hydrocarbon deposits in subterranean geological formations. Depending on the particular embodiment of the invention, portions of the analysis of the representation may be performed on the seismic survey vessel 20, such as by the signal processing unit 23. In accordance with other embodiments of the invention, the representation may be processed by a seismic data processing system (such as an exemplary seismic data processing system 320 that is depicted in FIG. 12 and is further described below) that may be, for example, located on land or on the vessel 20. Thus, many variations are possible and are within the scope of the appended claims.

The down going pressure waves create an interference known as "ghost" in the art. Depending on the incidence angle of the up going wavefield and the depth of the streamer 30, the interference between the up going and down going wavefields creates nulls, or notches, in the recorded spectrum. These notches may reduce the useful bandwidth of the spectrum and may limit the possibility of towing the streamers 30 in relatively deep water (water greater than 20 meters (m), for example).

The technique of decomposing the recorded wavefield into up and down going components is often referred to as wavefield separation, or "deghosting." The vertical particle motion data that is provided by the multi-component seismic sensors 58 allows the recovery of "ghost" free data, which means data that is indicative of the upgoing wavefield. Ghost free data may also be recovered from pressure measurements only when an over/under spread of streamers (one streamer above the other) is used.

A seismic event has certain directional propagation attributes, such as an azimuth and angle of incidence. Techniques and systems are described herein for purposes of determining a three-dimensional angle of incidence of a seismic event based on seismic data acquired by the seismic sensors of a single streamer. Such true three-dimensional angles of incidence may be impossible to determine, for example, from slowness-based array analysis that processes data from the entire array of streamers. Additionally, techniques and systems are described herein for purposes of determining an azimuth value of a seismic event from the seismic data acquired by the seismic sensors of a single streamer.

Figure 4:
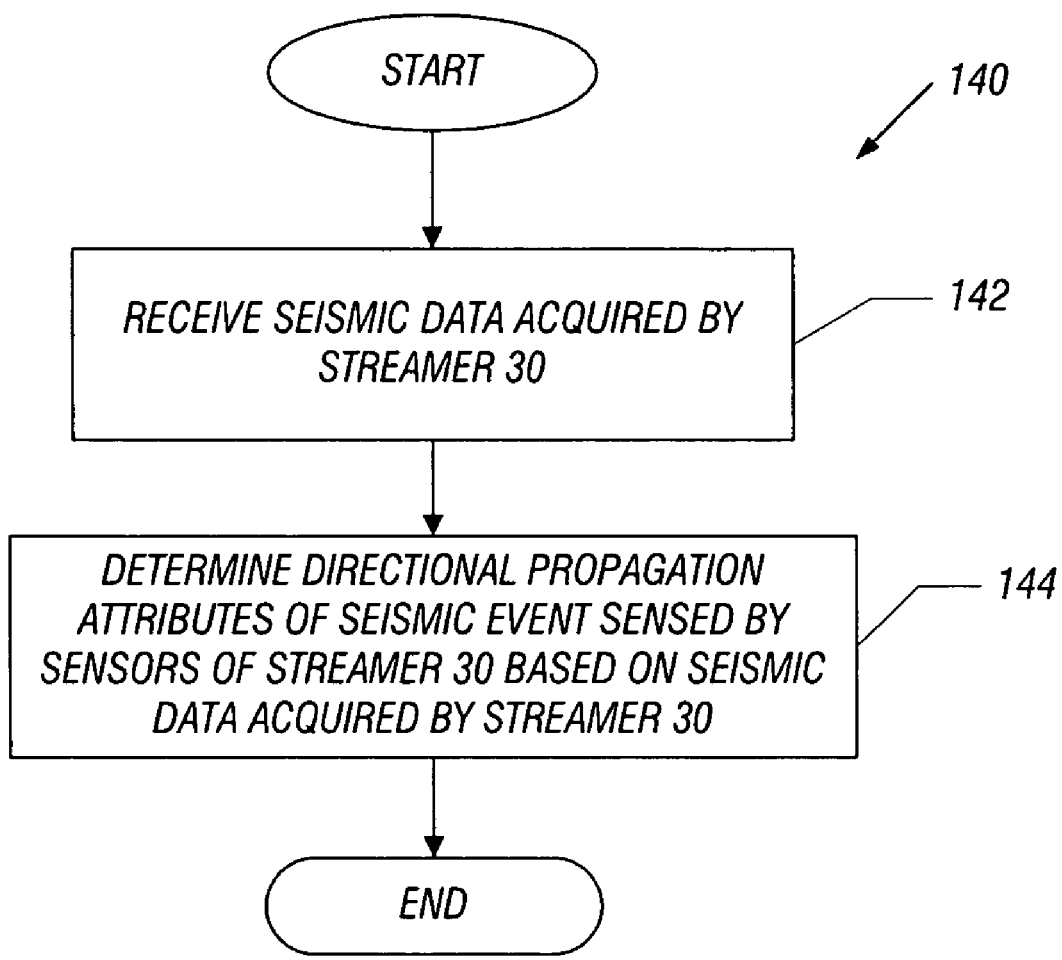
FIG. 4 is a flow diagram depicting a technique to determine directional propagation attributes of a seismic event from seismic data that is acquired by seismic sensors of a single streamer according to an embodiment of the invention.

More specifically, referring to FIG. 4, in accordance with embodiments of the invention, a technique 140 includes receiving seismic data acquired by seismic sensors of a single streamer 30, pursuant to block 142. It is noted that, in general, the streamer 30 may be part of an array of streamers. Furthermore, the streamer 30 may contain pressure sensors and particle motion sensors, or alternatively, each streamer may contain only pressure sensors. Regardless of the sensor composition of the streamer, directional propagation attributes of a seismic event that is sensed by the seismic sensors of the streamer are determined (block 144) based on the seismic data.

Figure 2:
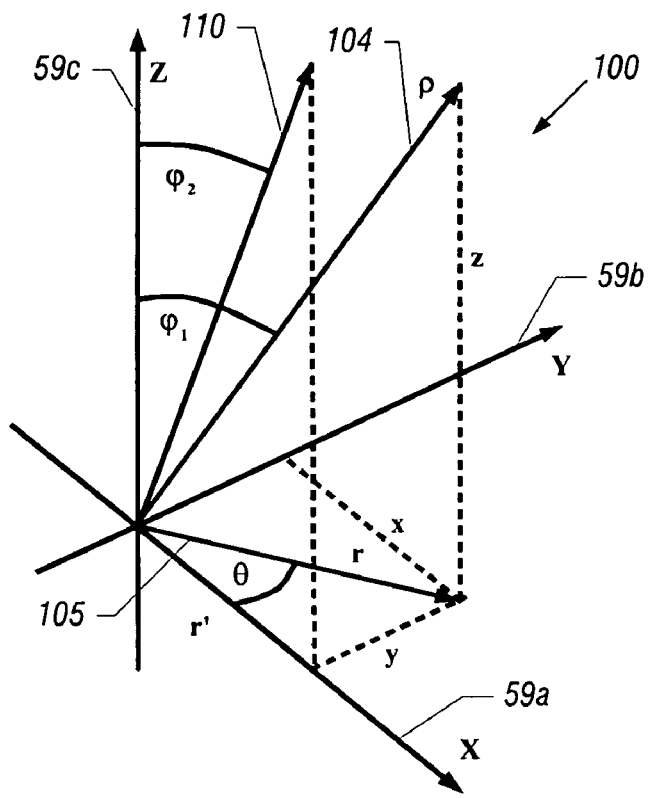
FIG. 2 is an illustration of directional propagation attributes of a plane wave according to an embodiment of the invention.

It is assumed herein that the sea surface is flat, and non-overlapping plane waves are incident upon a particular streamer. Referring to FIG. 2, in general, a particular plane wave may propagate along a direction parallel to a vector 104, which may be described in spherical coordinates by a three-dimensional incidence angle called "$\phi_1$" and an azimuth called "$\theta$." FIG. 2 depicts the vector 104 with respect to the following orthogonal axes: a depth, or z, axis 59c; an inline, or x, axis 59a that is directed along the streamer length; and a crossline, or y, axis 59b. The three-dimensional incidence angle $\phi_1$ is the angle between the plane wave vector 104 and the z axis 59c, and the azimuth θ is the angle between the x axis 59a and a projection 110 of the vector 104 onto the x-y plane.

Also depicted in FIG. 2 is a two-dimensional incidence angle called "$\phi_2$." The two-dimensional incidence angle $\phi_2$ is the angle between the projection 110 of the vector 104 onto the x-z plane and the z axis 59c. The two-dimensional incidence angle $\phi_2$ and the three-dimensional incidence angle $\phi_1$ are used for purposes of determining the value for the azimuth θ for the case where the streamer 30 does not contain particle motion sensors that each provide two horizontal particle motion measurements, as further described below.

Figure 3:
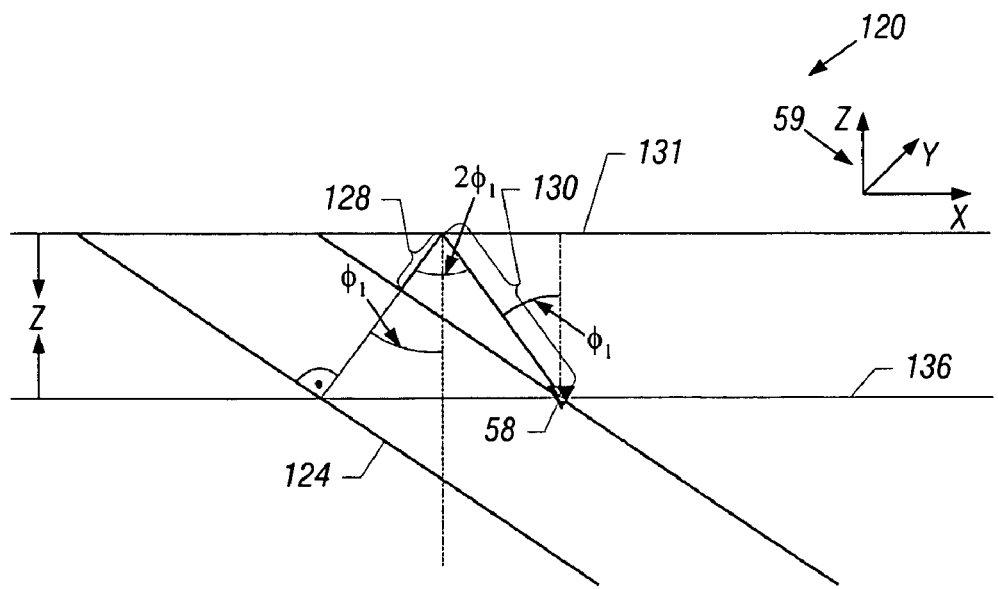
FIG. 3 is an illustration illustrating a time delay between an upgoing plane wave and a ghost that is produced by reflection of the upgoing plane wave at the sea surface according to an embodiment of the invention.

FIG. 3 depicts an illustration 120 of an upgoing wave and its resultant ghost wave that are both incident upon a seismic sensor 58. More specifically, a particular plane wave 124 may reflect off the sea surface (represented by a horizontal line 131) to produce a reflected, or ghost, wave that propagates to a particular seismic sensor 58 that is at a depth represented by a horizontal line 136. The seismic sensor 58 therefore detects two waves associated with the plane wave 124: the plane wave 124 which directly propagates to the seismic sensor 58; and the reflected, or ghost, wave, which propagates from the sea surface to the seismic sensor 58. As described herein, the time delay between the time when the seismic sensor 58 senses the plane wave 124 to the time when the seismic sensor 58 senses the ghost wave depends on the tow depth z of the streamer (represented in FIG. 3 as the distance between horizontal lines 131 and 136) and the three-dimensional incidence angle $\phi_1$.

As depicted in FIG. 3, when propagating past the seismic sensor 58 to the sea surface, the plane wave 124 travels along a path 128 that has an associated distance called "$l_1$." From the sea surface, the resulting ghost wave propagates along a path 130 to the seismic sensor 58. The path 130 has an associated length called "$l_2$." The additional distance (herein called "l") that is associated with the creation and propagation of the ghost wave may therefore be represented as follows:

$$l = l_1 + l_2,\qquad\text{Eq. 1}$$

where the $l_1$ and $l_2$ distances may be described as follows:

$$l_1 = \cos(2\cdot\phi_1)\cdot l_2, \text{ and}\qquad\text{Eq. 2}$$

$$l_2 = \frac{z}{\cos(\phi_1)}.\qquad\text{Eq. 3}$$

The time delay (herein called "Δt") between the arrival times of the ghost wave and the plane wave 124 at the seismic sensor 58 may be described as follows:

$$\Delta t = \frac{(l_1 + l_2)}{c} = \frac{2\cdot\cos(\phi_1)\cdot z}{c},\qquad\text{Eq. 4}$$

where "c" represents the velocity of sound in water. Eq. 4 may be inverted for the three-dimensional incidence angle $\phi_1$ when the tow depth z and the time delay Δt are known, as described below:

$$\phi_1 = \cos^{-1}\left(\frac{c\cdot\Delta t}{2\cdot z}\right).\qquad\text{Eq. 5}$$

Figure 5:
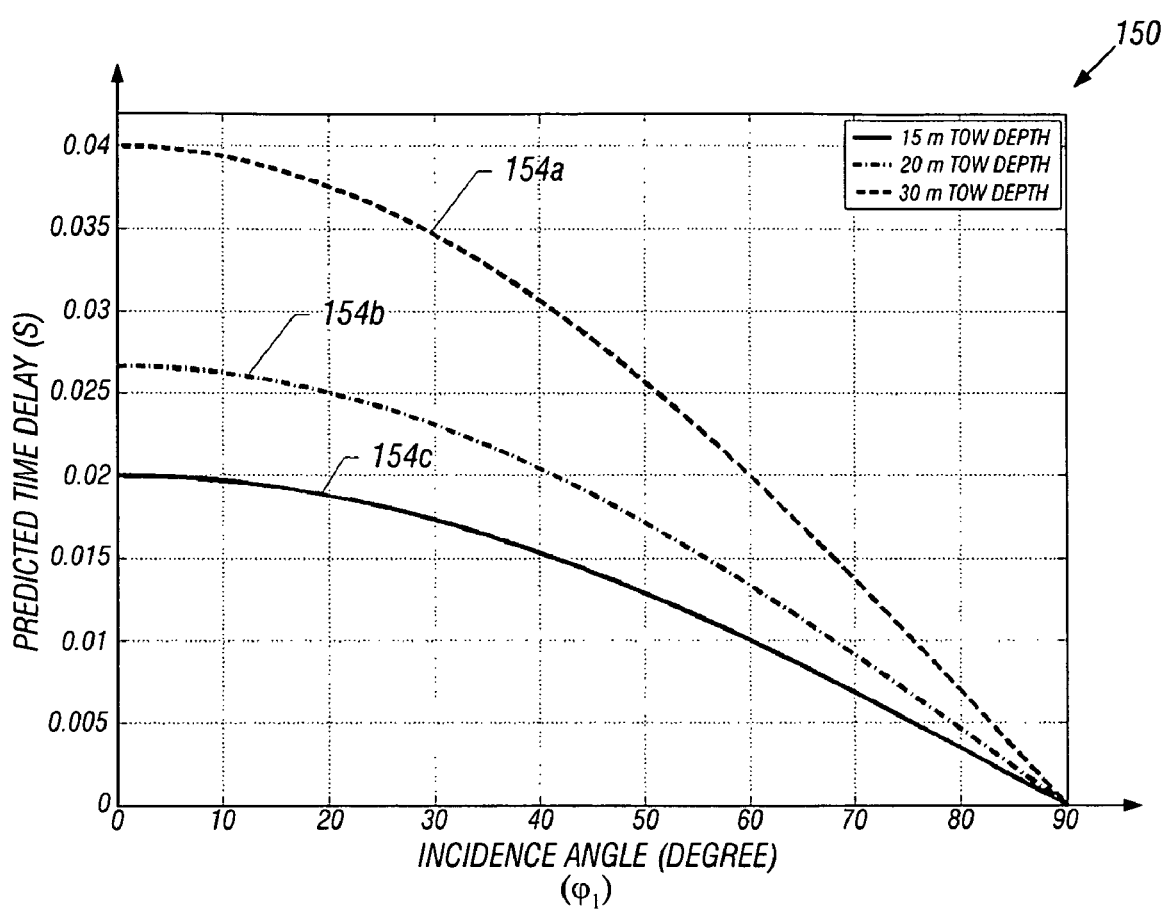
FIG. 5 is a graph illustrating a predicted time delay versus incidence angle for different tow depths according to an embodiment of the invention.

Referring to FIG. 5, as depicted in a graph 150, the time delay between the plane wave and its ghost wave depends on the tow depth z of the streamer 30. The different tow depths are associated with non-crossing curves (curves 154a, 154b and 154c, being depicted as examples) that may be used for angle-time delay matching. It is noted that the maximum time delay occurs for a vertically incident plane wave because although the slanted travel path is longer for a dipping wave, the phase of the plane wave for a dipping wave arriving at the same sensor is advanced compared to the upgoing wave, as depicted in FIG. 3.

Figure 6:
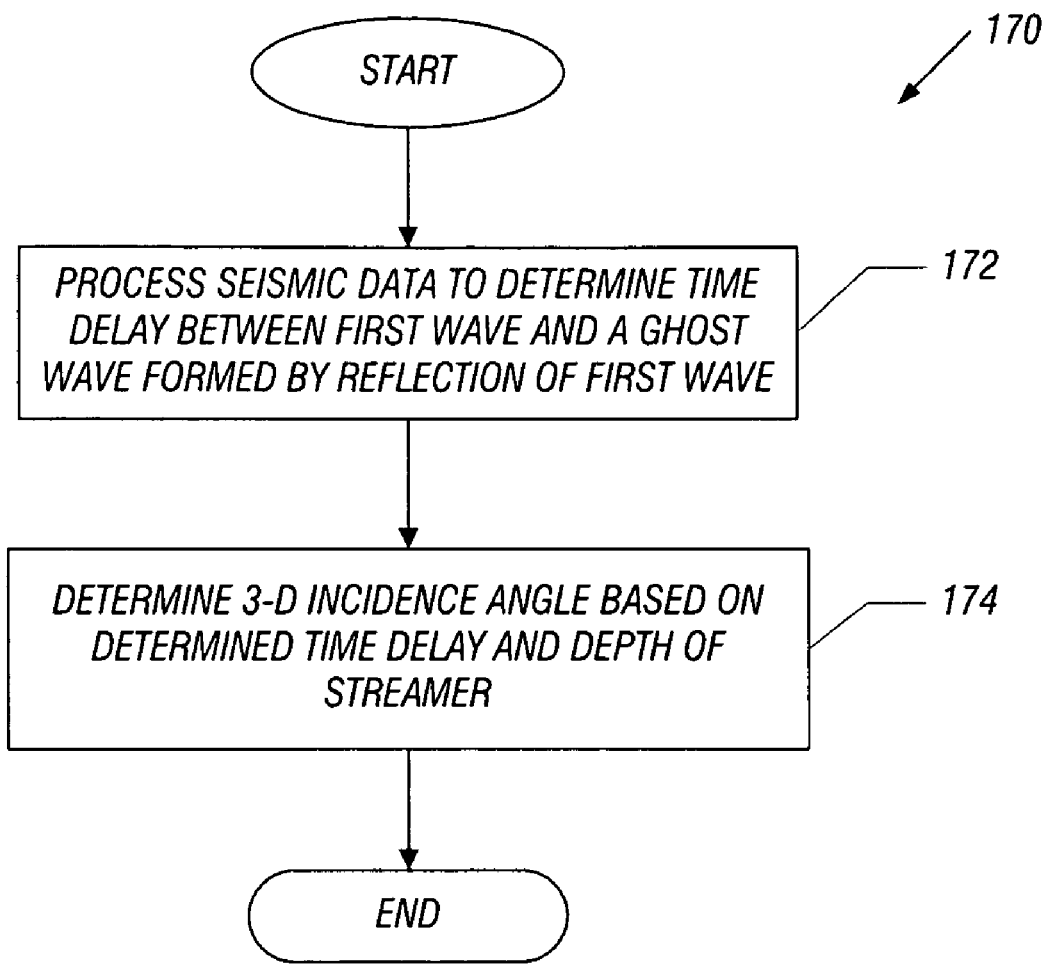
FIG. 6 is a flow diagram depicting a technique to determine a three-dimensional incidence angle of a seismic event according to an embodiment of the invention.

Referring to FIG. 6, in general, a technique 170 to determine the three-dimensional incidence angle $\phi_1$ involves determining (block 172) the time delay between the first wave and a ghost wave that is formed by reflection of the first wave. The three-dimensional incidence angle $\phi_1$ is determined, pursuant to block 174, based on the determined time delay and the depth of the streamer.

The specific manner in which the Δt time delay is determined, depends on whether the seismic data from the sensor 30 is deghosted, i.e., whether the seismic data has been processed to separate the seismic data into two sets of data: a first set of data indicative of the upgoing component of the sensed seismic event; and a second set of data indicative of the downgoing component (i.e., the ghost component) of the event. Assuming that the seismic data may be decomposed in this manner, the time delay Δt may be estimated as a function of time by cross-correlating the upgoing and downgoing components in a moving time window. The time that corresponds to the maximum correlation coefficient is selected as the time delay Δt, so that Eq. 5 may be applied to obtain the three-dimensional incidence angle $\phi_1$. For purposes of obtaining a time delay Δt that has a sufficient resolution (i.e., a resolution beyond the data sampling rate), a second order polynomial curve fitting algorithm may be applied around the maximum of the correlation coefficient function.

Figure 7:
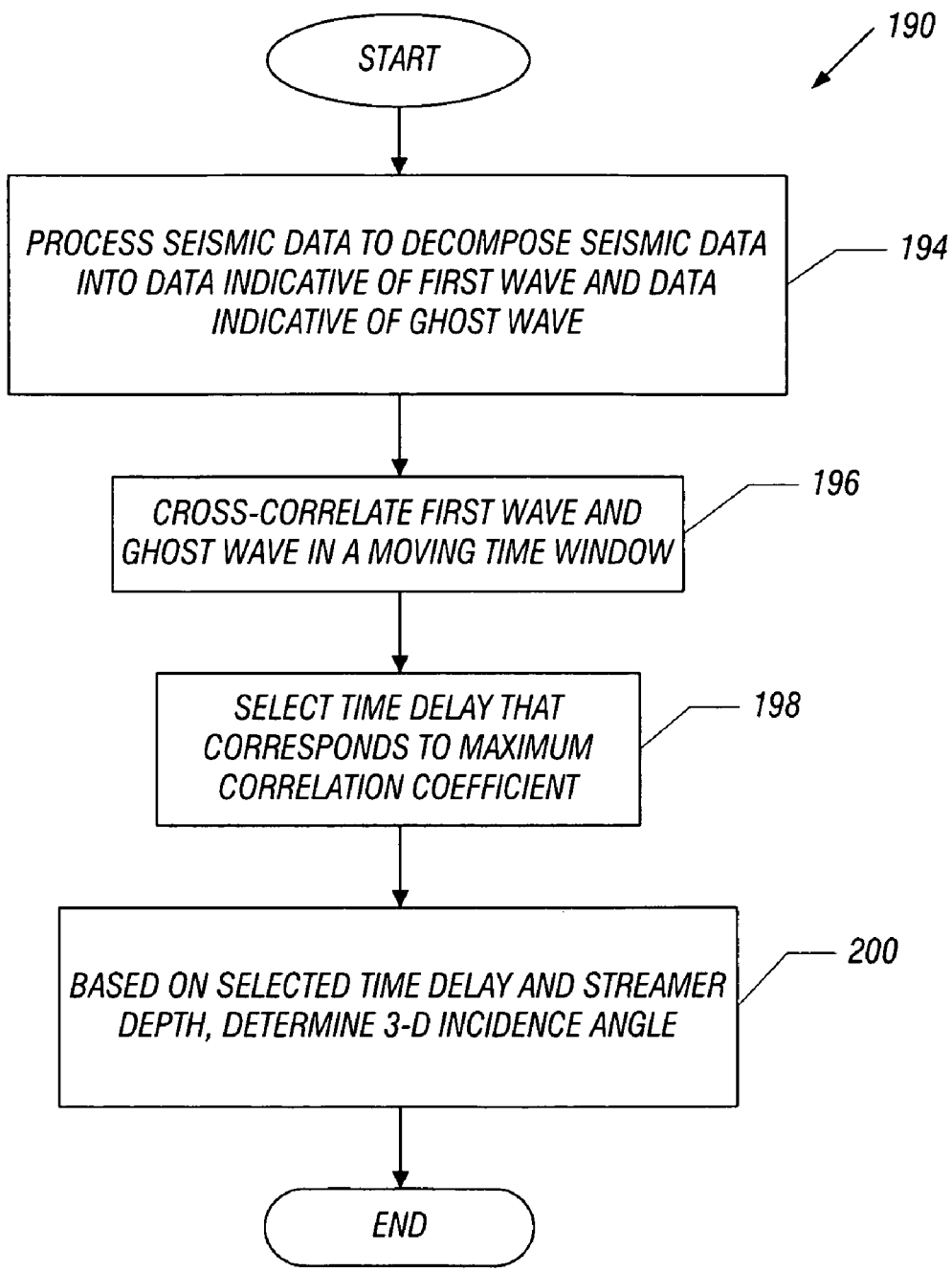
FIG. 7 is a flow diagram depicting a technique to determine a three-dimensional incidence angle of a seismic event based on decomposed seismic data according to an embodiment of the invention.

Thus, referring to FIG. 7, a technique 190 to determine the three-dimensional incidence angle $\phi_1$ in accordance with embodiments of the invention includes processing (block 194) seismic data acquired by seismic sensors of a single streamer to decompose the seismic data into a first set of data indicative of a first wave a second set of data indicative of a ghost wave. It is noted that several different techniques may be used for purposes of decomposing the seismic data, such as the techniques disclosed in U.S. Patent Application Ser. No. 60/971,189, entitled, "3D DEGHOSTING OF MULTICOMPONENT OR OVER/UNDER STREAMER RECORDINGS USING CROSS-LINE WAVENUMBER SPECTRA OF HYDROPHONE DATA" (Application Docket No. 14.0362) which was filed on Sep. 10, 2007, and hereby incorporated by reference in its entirety.

The technique 190 includes cross-correlating (block 196) the first wave and the ghost wave (as indicated by the first and second data sets) in a moving time window and selecting (block 198) the time delay Δt that corresponds to a maximum correlation coefficient. Based on the selected time delay Δt and the towing depth z, the three-dimensional incidence angle $\phi_1$ may be determined, pursuant to block 200.

It is noted that the time delay Δt may be also be estimated from decomposed hydrophone data or from any decomposed horizontal component of particle motion. Due to the negative reflection coefficient at the free surface for these data, the time delay Δt corresponds to the highest negative crosscorrelation coefficient. If the wavefield is decomposed using a two-dimensional, one-dimensional or vertical incidence approximation, the decomposition will be incomplete, and part of the upgoing wavefield will leak into the downgoing component (and vice-versa). This means that additional spurious events are present in both the up- and downgoing components. As the leakage occurs at exactly the same time as the event that is incorrectly decomposed, additional peaks may be present in the crosscorrelation function at zero crosscorrelation lag (Δt=0). In order to avoid that these waves will be incorrectly interpreted as plane waves propagating horizontally (see FIG. 3) the energy ratio between upgoing and downgoing components is considered in addition to the normalized crosscorrelation coefficient function. A peak in the crosscorrelation function is only interpreted when the energy ratio is as close to unity as it can be expected for a flat sea surface. For events that leak into the upgoing or downgoing trace, the energy ratio is expected to be smaller than, for example, ¾ or larger than, for example, $\frac{4}{3}$.

If decomposition of the detected seismic event into upgoing and downgoing components is not possible, then cepstral analysis on moving time windows may be applied to estimate the time delay between an upgoing plane wave and its ghost. In general, the free surface reflection of the upgoing plane wave may be considered an echo of the upgoing plane wave. In general, the cepstral analysis involves calculating the inverse Fourier transform (called "$FT^{-1}$" below) of the logarithmic spectrum of the signal to convert the signal back into the time domain, as described below:

$$\text{cepstrum} = FT^{-1}(\ln(|FT(\text{signal})|)).$$ Eq. 6

The cepstrum has a peak at the time delay that corresponds to the time delay Δt between an upgoing plane wave and its free surface reflection. In principal, the logarithmic conversion of the spectrum may be omitted to find the periodicity of a signal. Similar peaks may be obtained using the absolute values of the spectrum. Furthermore, the transform of the signal into the frequency domain is not limited to the Fourier transform. For example, a wavelet transformation, S-transformation or Wigner-Ville transformation may be used, as just a few examples and may offer better temporal resolution. The temporal resolution of the peak in the cepstrum may be increased by fitting a second order polynomial curve to the peak in the cepstrum.

Figure 8:
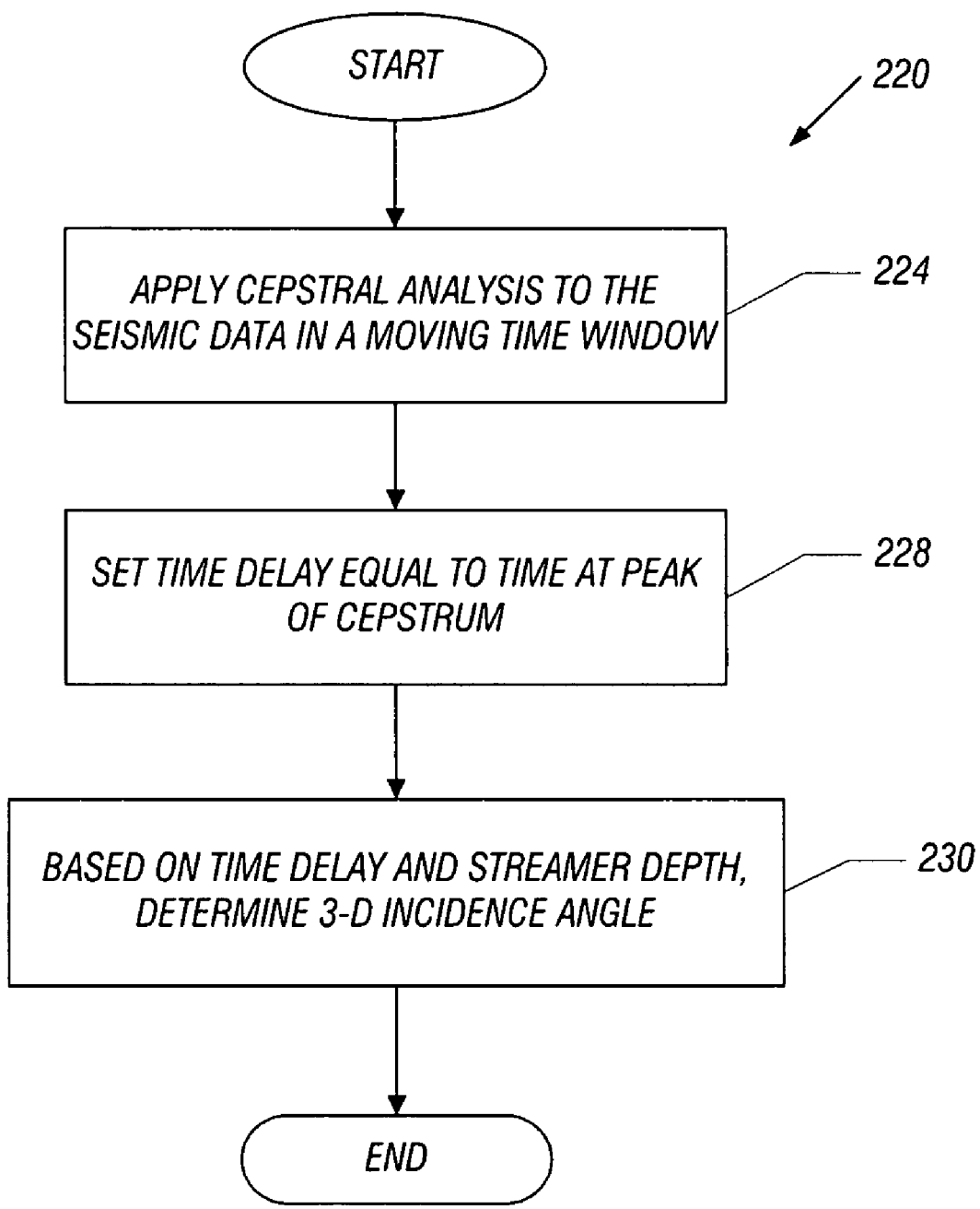
FIG. 8 is a flow diagram depicting a technique to determine a three-dimensional incidence angle of a seismic event based on cepstral analysis of seismic data according to an embodiment of the invention.

Thus, referring to FIG. 8, a technique 220 to determine the three-dimensional incidence angle $\phi_1$ in accordance with embodiments of the invention includes applying cepstral analysis to acquired seismic data in a moving time window, pursuant to block 224. A time delay Δt is set equal (block 228) to the time at the peak of the cepstrum. The three-dimensional incidence angle is determined (block 230) based on the time delay Δt and the tow depth z of the streamer 30.

For both of the techniques 190 and 220, the time delay Δt between the upgoing and downgoing waves does not yield information whether the plane wave arrives from an incidence angle $\phi_1$ that is clockwise or counterclockwise from the z axis. In other words, mapping the time delay Δt to the three-dimensional angle of incidence $\phi_1$ provides positive angles only. The sign of the incidence angle $\phi_1$ is resolved by cross-correlating the pressure component with the inline particle velocity component. More specifically, negative crosscorrelation coefficients indicate negative incidence angles, and vice versa. If the inline particle velocity component is not measured directly, the component may be calculated, for example, from the spatial inline derivative of the pressure, which is usually densely sampled inline.

Because the free surface reflection coefficient is the same for the inline particle velocity and pressure, the interference of the downgoing ghost affects the particle motion recorded on both components in exactly the same way. Therefore, decomposition of the pressure component and decomposition of the inline velocity component are not required for this processing task.

Figure 9:
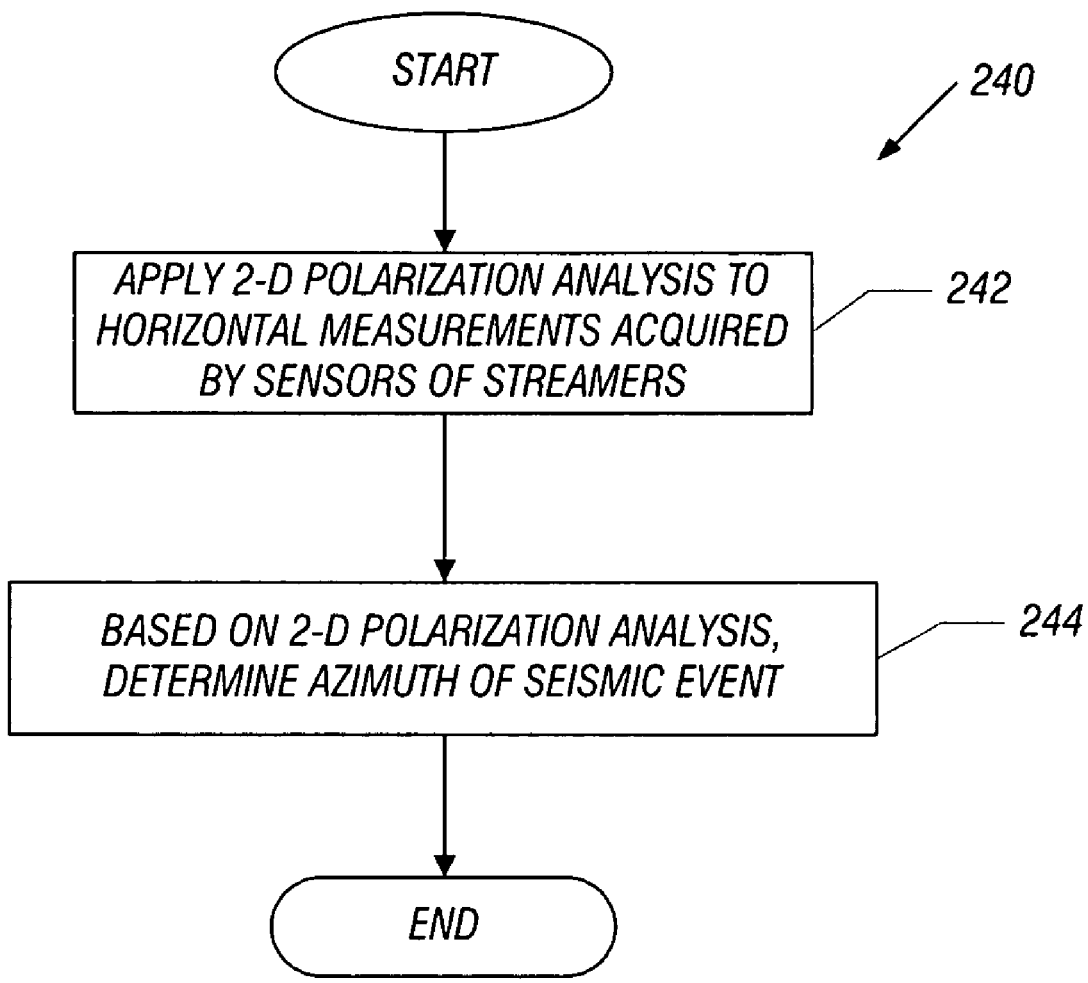
FIG. 9 is a flow diagram depicting a technique to determine an azimuth of a seismic event based on two-dimensional polarization analysis of horizontal measurements according to an embodiment of the invention.

Another directional propagation attribute that may be calculated from the seismic data acquired by the seismic sensors of a single streamer in accordance with embodiments of the invention is the value for the azimuth θ (see FIG. 2). The technique that is used to determine the azimuth value depends on whether horizontal particle motion measurements (i.e., inline and crossline velocity measurements, for example) are available. If the horizontal components are measured, then a technique 240 that is depicted in FIG. 9 may be used to determine the azimuth value of the seismic event. Pursuant to the technique 240, a two-dimensional polarization analysis is applied (block 242) to the horizontal measurements; and based on the two-dimensional polarization analysis, the azimuth value may be determined, pursuant to block 244. The two-dimensional polarization analysis may be applied because the free surface reflection coefficient is the same for both horizontal components. Therefore, the interference of the downwardly directed ghost wave affects the particle motions that are acquired by inline and crossline particle motion sensors in exactly the same way.

As a more specific example, the two-dimensional polarization analysis may be performed using a technique that is set forth in U.S. Pat. No. 6,205,403, entitled "METHOD FOR DETERMINING HORIZONTAL GEOPHONE ORIENTATION IN OCEAN BOTTOM CABLES," which granted on Mar. 20, 2001. This technique is based on cross-correlation of coefficients between the different horizontal measurements. Alternatively, the two-dimensional polarization analysis may be based on eigenvalue analysis of the covariance matrix of the horizontal data in a moving time window, such as a technique that is set forth in Jurkevics, A., 1988, "Polarization Analysis of Three-Component Array Data," Bulletin of the Seismological Society of America, 78, no. 5, pp. 1725-1743. Another example of the eigenvalue analysis of the covariance matrix technique is described in Vidale, J. E., 1986, "Complex Polarization Analysis of Particle Motion," Bulletin of the Seismological Society of America, 76, no. 5, pp. 1393-1405. In this latter method, the linearity as an additional polarization attribute is provided. In general, the linearity may be used as a quality measure of the obtained azimuth value. Furthermore, an additional quality factor, such as $\sin(\phi_1)$, may be used for purposes of checking whether the signal strength on the horizontal components is sufficiently high to provide stable results for the azimuth value.

It is noted that the azimuth θ may be resolved by both methods for a range of −90 to +90 degrees. In other words, it is possible to resolve whether the wavefield arrived from left or right of the streamer 30.

If the horizontal particle motion measurements are not available, then another technique may be used to derive the azimuth value based on the following. The true three-dimensional incidence angle $\phi_1$ differs from the two-dimensional incidence angle $\phi_2$, as graphically depicted in FIG. 2. In general, the two-dimensional incidence angle $\phi_2$, which is a projected incidence angle, depends on the azimuth θ and the three-dimensional incidence angle $\phi_1$ in the following manner:

$$\varphi_2 = \sin^{-1}\left(\sqrt{\sin(\varphi_1)^2 - \left(\frac{\tan(\theta) \cdot x}{\rho}\right)^2}\right). \quad \text{Eq. 7}$$

Figure 11:
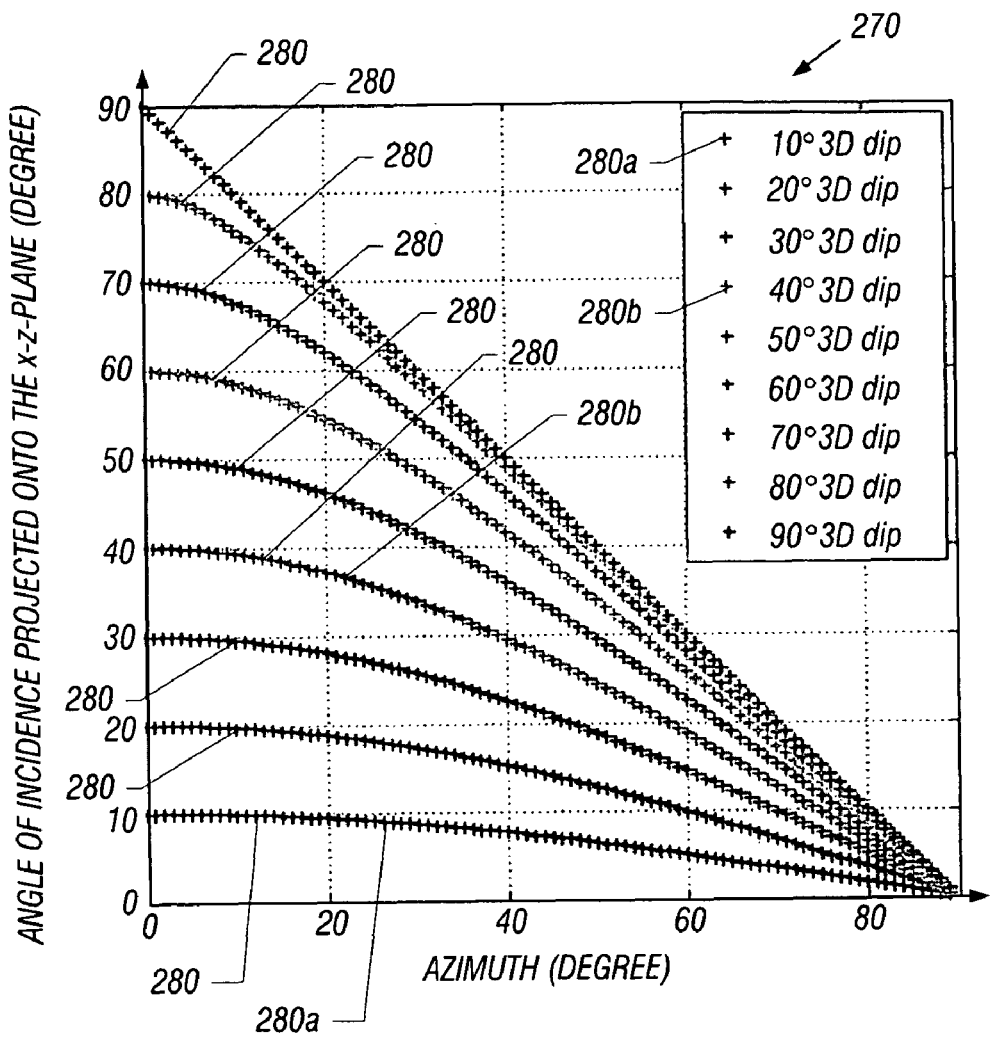
FIG. 11 is a graph of projected two-dimensional incidence angles versus azimuth for different three-dimensional incidence angles according to an embodiment of the invention.

As graphically depicted in FIG. 11, the azimuth θ may be mapped when both the true three-dimensional incidence angle $\phi_1$ as well as the two-dimensional incidence angle $\phi_2$ are known. In general, FIG. 11 depicts a graph 270 of exemplary three-dimensional incidence angles $\phi_1$ 280. Each curve 280 depicts the relationship between the two-dimensional incidence angle $\phi_2$ and the azimuth θ. As specific examples, the curve 280a depicts the relationship between the two-dimensional incidence angle $\phi_2$ and the azimuth θ for a three-dimensional incidence angle $\phi_1$ of ten degrees. As another example, the curve 280b depicts a relationship between the two-dimensional incidence angle $\phi_2$ and the azimuth θ for a three-dimensional incidence angle $\phi_1$ of forty degrees.

As set forth above, the three-dimensional incidence angle $\phi_1$ may be obtained based on the time delay Δt between the incoming plane wave and its ghost. The two-dimensional incidence angle $\phi_2$ may be obtained from the time delay between coherent arrivals at different inline sensors of the streamer 30. More specifically, a time delay Δt may be determined using such techniques as slant stack, semblance or multi-channel-crosscorrelation; and the resultant delay time Δt and the tow depth z may be used to invert for the two-dimensional incidence angle $\phi_2$ using an equation similar to that of Eq. 5.

Using the determined values for the incidence angles $\phi_1$ and $\phi_2$, the azimuth θ may be obtained, as described below:

$$\theta = \pm\tan^{-1}\left(\left|\frac{\sqrt{(\sin(\varphi_1))^2 - (\sin(\varphi_2))^2}}{\sin(\varphi_2)}\right|\right). \quad \text{Eq. 8}$$

It is noted that Eq. 8 does not provide the sign of the azimuth θ. In the case of a purely vertically traveling wave, the incidence angles $\phi_1$ and $\phi_2$ are zero, which means $\sin(\phi_1)$ and $\sin(\phi_2)$ are zero to obtain a singularity in Eq. 8. However, this singularity may be resolved by defining the azimuth θ as being equal to zero when the incidence angle $\phi_1$ and $\phi_2$ indicate a vertically traveling plane wave. For all other angles (angles between zero and ninety degrees), the azimuth θ determined by Eq. 8 is an absolute value. Thus, Eq. 8 does not resolve whether the wavefield arrived from the left or right of the streamer 30. The sign of the azimuth θ may be obtained from the sign of the time delay between coherent arrivals at adjacent crossline sensors (i.e., adjacent seismic sensors located on adjacent streamers). The time delay between coherent arrivals may be determined using such techniques as semblance, slant-stack or multi-channel-crosscorrelation, as just a few examples).

Figure 10:
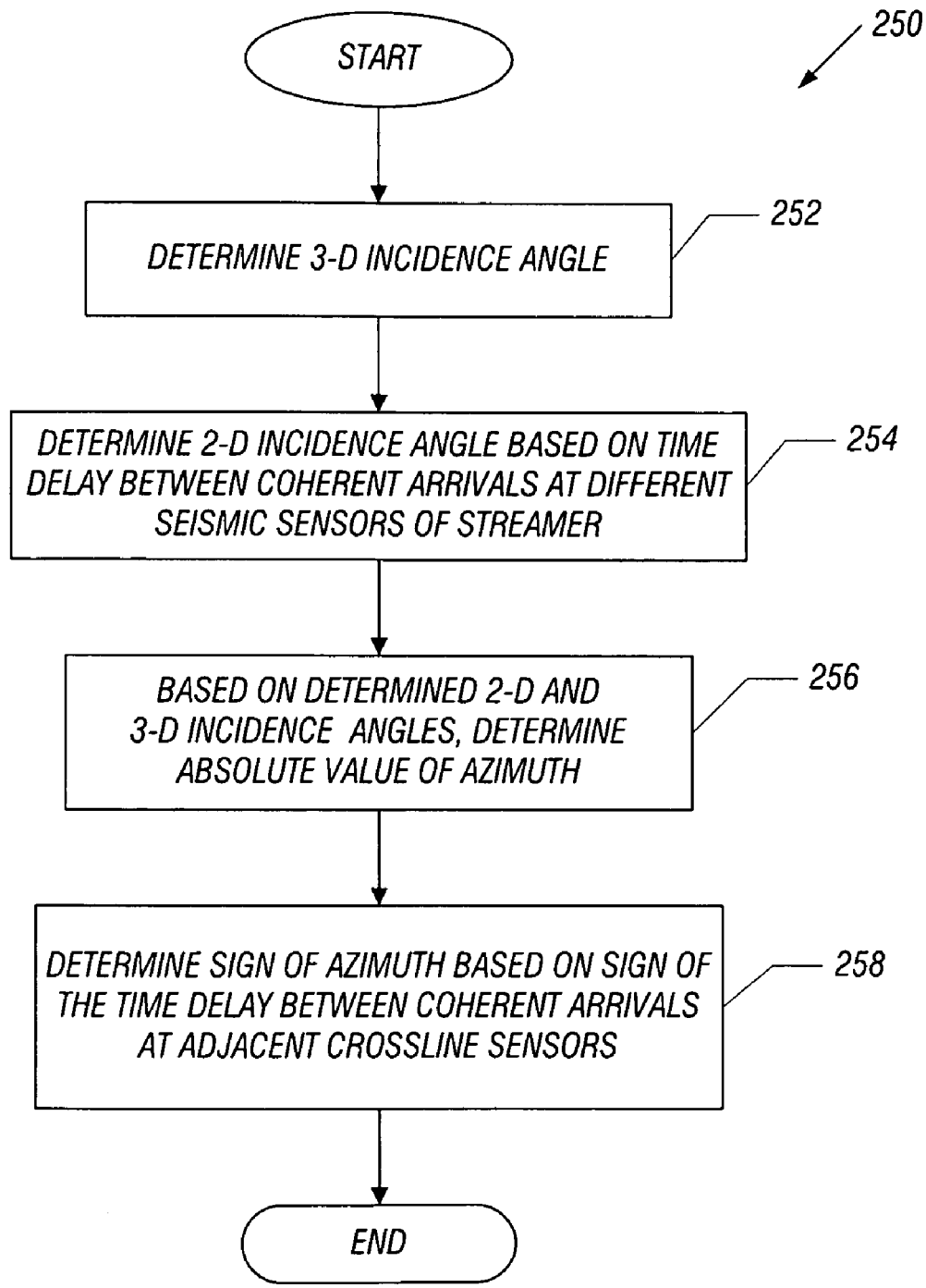
FIG. 10 is a flow diagram depicting a technique to determine an azimuth of a seismic event when horizontal particle motion measurements are unavailable according to an embodiment of the invention.

Thus, referring to FIG. 10, a technique 250 to determine an azimuth θ includes determining, pursuant to block 252, a three-dimensional incidence $\phi_1$ and determining (block 254) a two-dimensional incidence angle $\phi_2$ based on a time delay between coherent arrivals at different seismic sensors of the streamer 30. Based on the determined two-dimensional and three-dimensional incidence angles $\phi_1$ and $\phi_2$, the absolute value of the azimuth θ may then be determined, pursuant to block 256. The sign of the azimuth θ is determined (block 258) based on a sign of the time delay between coherent arrivals at adjacent crossline sensors.

The advantages of the techniques that are described herein may include one or more following. The correct three-dimensional incidence angle $\phi_1$ as well as the correct azimuth θ of the plane wave may be determined from a single streamer when both horizontal particle velocity components are available. In the case that the crossline particle velocity cannot be measured or calculated from the pressure data, the correct three-dimensional incidence angle $\phi_1$ as well as the correct absolute azimuth value θ of the plane wave from a single streamer 30 is determined, and thus, the adjacent streamers are used only for purposes of resolving the sign of the azimuth value θ.

Referring to FIG. 12, in accordance with some embodiments of the invention, a seismic data processing system 320 may perform at least part of the techniques that are disclosed herein for purposes of determining directional propagational attributes of a seismic event. In accordance with some embodiments of the invention, the system 320 may include a processor 350, such as one or more microprocessors and/or microcontrollers. The processor 350 may be located on a streamer 30 (FIG. 1), located on the vessel 20 or located at a land-based processing facility (as examples), depending on the particular embodiment of the invention.

The processor 350 may be coupled to a communication interface 360 for purposes of receiving seismic data that corresponds to the acquired pressure and/or particle motion measurements. Thus, in accordance with embodiments of the invention described herein, the processor 350, when executing instructions stored in a memory of the seismic data processing system 320, may receive multi-component data that is acquired by multi-component seismic sensors while in tow (seismic sensors located on streamers, for example). It is noted that, depending on the particular embodiment of the invention, the multi-component data may be data that is directly received from the multi-component seismic sensor as the data is being acquired (for the case in which the processor 350 is part of the survey system, such as part of the vessel or streamer) or may be multi-component data that was previously acquired by the seismic sensors while in tow and stored and communicated to the processor 350, which may be in a land-based facility, for example.

As examples, the interface 360 may be a USB serial bus interface, a network interface, a removable media (such as a flash card, CD-ROM, etc.) interface or a magnetic storage interface (IDE or SCSI interfaces, as examples). Thus, the interface 360 may take on numerous forms, depending on the particular embodiment of the invention.

In accordance with some embodiments of the invention, the interface 360 may be coupled to a memory 340 of the seismic data processing system 320 and may store, for example, various input and/or output data sets involved with the techniques 140, 170, 190, 220, 240 and/or 250, as indicated by reference numeral 348. The memory 340 may store program instructions 344, which when executed by the processor 350, may cause the processor 350 to perform one or more of the techniques that are disclosed herein, such as the techniques 140, 170, 190, 220, 240 and/or 250 and display results obtained via the technique(s) on a display (not shown in FIG. 12) of the system 320, in accordance with some embodiments of the invention.

Other systems and techniques are contemplated and are within the scope of the appended claims. For example, the techniques and systems that are described herein may be applied to seabed recordings provided that the direct wave is muted, and the wavefield is decomposed acoustically (i.e., decomposed just above the sea floor involving the pressure P and vertical velocity $V_Z$ measurements only). In this case, the same ghost model that is used in the marine setting may be used. As another example, the techniques and systems that are disclosed herein may be applied to land acquisitions. More specifically, the techniques and systems may be applied to buried receivers, as well as vertical seismic profiling (VSP) recordings. More specifically, the systems and techniques may be applied provided that the wavefield may be decomposed into upgoing and downgoing pressure and stress waves, and the velocities of these waves are known. Thus, depending on the particular embodiment of the invention, the sensor cables may be towed streamer cables, such as the streamers 30 (see FIG. 1); stationary cables that include seismic sensors and are disposed on the sea bed; terrestrial, or land-based, cables that include seismic sensors; buried cables that include seismic sensors; etc.

It is noted that the systems and techniques that are disclosed herein are not limited to the interference between a single upgoing wave and its reflection at an interface (such as the air-sea interface, for example). In this regard, the systems and techniques that are disclosed herein also apply when a downward reflected wave interferes with a different upgoing wave, as long as there is a model that relates the time difference between the upgoing wave and its downward reflection to the 3-D angle of incidence of the upgoing wave, and the plane wave assumption is valid. Thus, the systems and techniques that are disclosed herein are useful in the typical seismic setting when the upgoing wavefield consists of a transient sequence of subsurface reflections.

As will be appreciated by one of skill in the art, the techniques and systems described herein may likewise be applied to data sorted in common receiver gathers. Note that in that case, it is the time-delay between the downgoing source wavelet and the source-ghost that, together with the source depth and the water velocity, provides information about the three-dimensional take-off angle. The resulting estimates then are the following: the three-dimensional take-off angle, two-dimensional (projected) take-off angle and the take-off azimuth.

Other embodiments are with the scope of the appended claims. For example, in accordance with other embodiments of the invention, the 3-D incidence angle $\phi_1$ may be determined based on the 2-D incidence angle $\phi_2$ and the azimuth $\theta$. It is assumed that the horizontal components of the particle velocity (from the spatial in-line and cross-line derivatives of the total pressure wavefield) may be measured or calculated. Thus, horizontal particle motion is either measured with a multi-component sensor or derived from the inline and crossline spatial derivative of the seismic wavefield recorded with at least three single component sensors or hydrophones.

The free sea surface reflection coefficient on the horizontal components at a flat sea surface has the same sign. This in turn means that the polarization of the particle motion in the horizontal plane does not suffer from the interference of the upgoing and downgoing wavefield. For this reason the azimuth $\theta$ of a wavefield's propagation direction may still be estimated using, for example, hodograms or a 2-D version of the eigenvalue analysis, as described above. The time delay between coherent arrivals at different in-line sensors may also be estimated from the moveout curve along a streamer (e.g., using semblance, slant-stack or multi-channel crosscorrelation). This time delay provides horizontal slowness which may be inverted in a projected 2-D angle of incidence if the velocity of sound in water is known.

Referring back to FIG. 2, the vector 104 of the seismic event may be described by its length $\rho$, the azimuth $\theta$ and the 3-D incidence angle $\phi_1$. The azimuth $\theta$, which is measured from the x-axis is defined as follows:

$$\theta = \tan^{-1}\left(\frac{y}{x}\right), \quad \text{Eq. 9}$$

with x and y being the horizontal components of the vector 104. Furthermore, the 3-D incidence angle $\phi_1$ may be defined as follows:

$$\varphi_1 = \tan^{-1}\left(\frac{r}{z}\right), \quad \text{Eq. 10}$$

with "z" being the vertical component of the vector 104, and "r" being described as follows:

$$r = \sqrt{x^2 + y^2} = \rho \cdot \sin(\phi_1), \quad \text{Eq. 11}$$

The 2-D incidence angle $\phi_2$, which is formed from the projection of the vector 104 onto the x-z plane may be described as follows:

$$\varphi_2 = \tan^{-1}\left(\frac{r'}{z}\right), \quad \text{Eq. 12}$$

where "r'" is described as follows:

$$r' = \sqrt{x^2 + 0^2} = \pm x = \rho \cdot \sin(\phi_2). \quad \text{Eq. 13}$$

Eq. 11 may be rewritten to solve for y by substituting x with Eq. 12, as described below:

$$\sqrt{(\rho \cdot \sin(\varphi_2))^2 + y^2} = \rho \cdot \sin(\varphi_1) \quad \text{Eq. 14}$$
$$(\rho \cdot \sin(\varphi_2))^2 + y^2 = (\rho \cdot \sin(\varphi_1))^2,$$
$$\pm y = \rho \cdot \sqrt{(\sin(\varphi_1))^2 - (\sin(\varphi_2))^2}$$

By substituting Eqs. 13 and 14 in Eq. 9, Eq. 8 may be rewritten to solve for the 3-D incidence angle $\phi_1$, as described below:

$$\phi_1 = \text{sign}(\phi_2) \cdot \sin^{-1}\left(\sqrt{\tan(\theta)^2 \cdot \sin(\phi_2)^2 + (\sin(\phi_2))^2}\right). \quad \text{Eq. 15}$$

It is noted that the 3-D incidence angle $\phi_1$ always has the same sign as the projected, 2-D incidence angle $\phi_2$.

The advantage here is that the estimate of the 3-D incidence angle $\phi_1$ does not rely on the decomposition of the wavefield into its upgoing and downgoing constituents provided that the upgoing wavefield and its free surface reflection have the same slowness vector (which is the case for a plane wave reflected at a flat sea surface). This approach also does not depend on the tow depth of the streamer.

Figure 13:
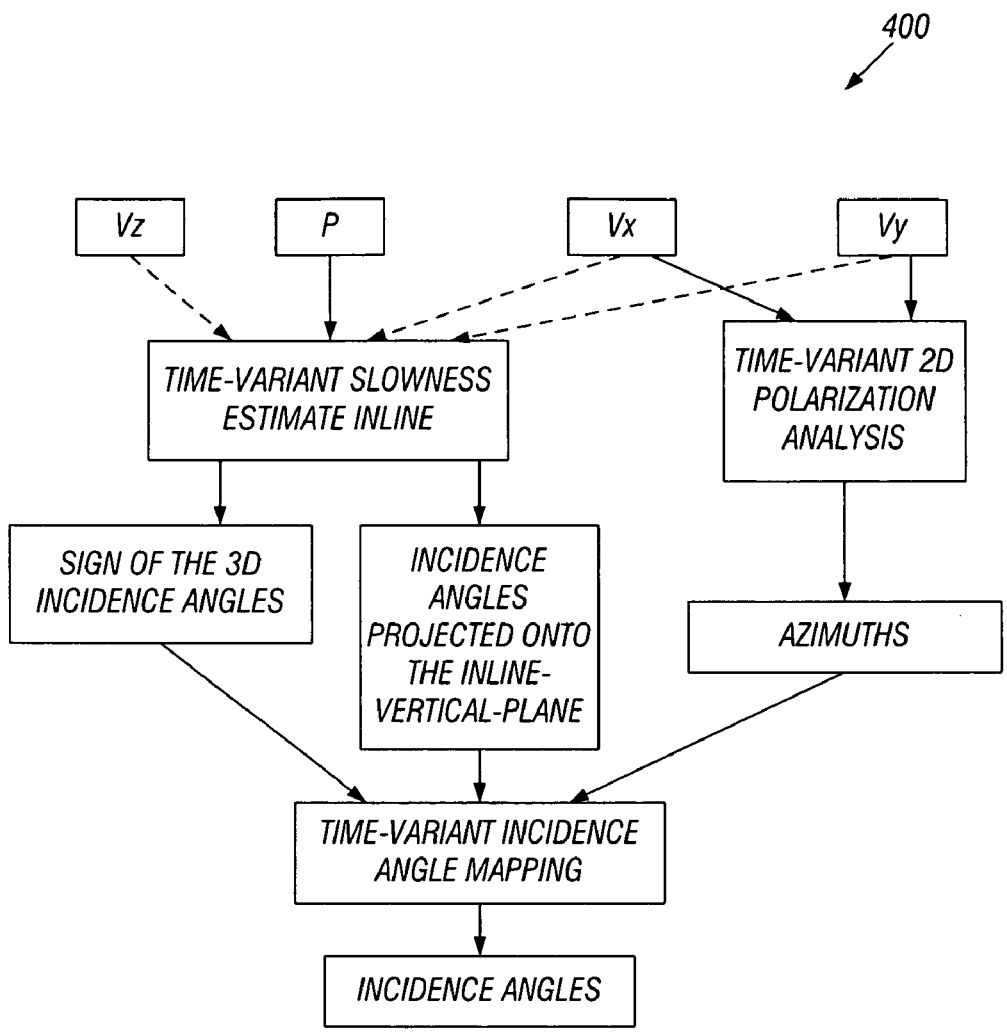
FIG. 13 is a work flow for estimating directional propagation attributes of a seismic event according to an embodiment of the invention.

To summarize, the workflow 400 for the estimation of the 3-D angle of incidence is depicted in FIG. 13. As indicated in the workflow 400, the slowness estimate may be determined from either the pressure component or any of the particle velocity components.

The slowness estimate at different components may lead to different 2-D incidence angles, depending whether single or multiple event arrivals are processed. In contrast, only one azimuth value is obtained using 2-D polarization analysis.

Alternatively, if the horizontal components are not available for polarization analysis, the azimuth may also be estimated using the ratio between the cross-line slowness $p_y = dt/dy$ and the in-line slowness $p_x = dt/dx$, as described below:

$$\theta = \tan^{-1}\left(\frac{p_y}{p_x}\right),\qquad \text{Eq. 16}$$

or the ratio between the cross-line wavenumber $k_y$ and the in-line wavenumber $k_x$, as described below:

$$\theta = \tan^{-1}\left(\frac{k_y}{k_x}\right).\qquad \text{Eq. 17}$$

This approach to estimate the azimuth θ is especially applicable to dual sensor data, over/under data, multi-component data or even conventional hydrophone streamer data. Data are usually denser sampled in-line (along a streamer) than cross-line (adjacent streamer sampling). This might effect the accuracy of the $p_y$ values differently than the $p_x$ values.

Alternatively, the techniques and systems that are described herein may be applied to common receiver or other types of gathers by applying various forms of source-receiver reciprocity. As can be appreciated by one of skill in the art, the pressure recorded in point A, due to a point source of volume injection in point B is the same as the pressure recorded in point B, due to a point source of volume injection in point A. This means that a common receiver gather of pressure recordings in point A, due to a range of (approximate) point sources (B-Z) is equivalent to a common shot gather of pressure recordings in points (B-Z) due to an (approximate) point source at location A.

As can also be appreciated by one of skill in the art, the pressure recording in point A, due to an impulsive point force in the x/y/z-direction in point B is reciprocal with the x/y/z component of particle velocity recorded in point B due to a point source of volume injection in point A. Thus, the techniques and systems that are described herein may be applied to common receiver and/or other gathers, after the application of the above described various forms of reciprocity, provided that, in addition to (approximate) point sources of volume injection, the following is used: (approximate) uni-directional point sources, or, equivalently, various source-side gradients, or dipole sources.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
obtaining first seismic data acquired by at least one seismic sensor; and
processing the first seismic data to determine a value indicative of a three-dimensional angle of incidence of a seismic event based on the first seismic data, comprising:
determining a time delay between a first wave and a ghost wave formed by reflection of the first wave, and
determining the three-dimensional angle of incidence based at least in part on the time delay.

2. The method of claim 1, wherein said at least one seismic sensor comprises sensors located on towed streamers arranged in an over/under configuration.

3. The method of claim 1, wherein said at least one seismic sensor comprises only hydrophones.

4. The method of claim 1, wherein said at least one seismic sensor comprises one or more seismic sensors towed in the water, stationary on a seabed floor or stationary sensor on land.

5. The method of claim 1, wherein said at least one seismic sensor comprises one or more buried sensors.

6. The method of claim 1, wherein the act of determining the time delay comprises:
processing the first seismic data to decompose the first seismic data into second data indicative of the first wave and third data indicative of the ghost wave; and
processing the second and third data to cross-correlate the first wave and the ghost wave in a moving time window to determine the time delay.

7. The method of claim 1, wherein the act of determining the time delay comprises:
applying cepstral analysis on the first seismic data.

8. The method of claim 1, wherein the first seismic data comprises data sorted in a gather.

9. The method of claim 8, wherein the gather comprises a common receiver gather produced by multiple sources and a single receiver location.

10. An article comprising a computer readable storage medium to store instructions that when executed by a processor-based system cause the processor based system to:
receive first seismic data acquired by at least one seismic sensor;
process the first seismic data to determine a value indicative of a three-dimensional angle of incidence of a seismic event based on the first seismic data;
determine a time delay between a first wave and a ghost wave formed by reflection of the first wave, and
determine the three-dimensional angle of incidence based at least in part on the time delay.

11. A system comprising:
an interface to receive first seismic data acquired by at least one seismic sensor; and
a processor to process the first data to determine a value indicative of a three-dimensional angle of incidence of a seismic event based on the first data, the processor adapted to:
determine a time delay between a first wave and a ghost wave formed by reflection of the first wave, and
determine the three-dimensional angle of incidence based at least in part on the time delay.

12. The system of claim 11, further comprising:
a survey vessel to tow said at least one seismic sensor,
wherein the processor is located on the first sensor cable.

13. The system of claim 11, further comprising:
a survey vessel to tow said at least one seismic sensor,
wherein the processor is not located on the first sensor cable.

14. The system of claim 11, wherein the said at least one seismic sensor comprises one or more seismic sensors towed in water, stationary on a seabed floor or stationary on land.

15. The system of claim 11, wherein the said at least one seismic sensor comprises one or more buried sensors.

16. The system of claim 11, wherein the processor is adapted to:
process the first seismic data to decompose the first seismic data into second data indicative of the first wave and third data indicative of the ghost wave; and
process the second and third data to cross-correlate the first wave and the ghost wave in a moving time window to determine the time delay.

17. The system of claim 11, wherein the processor is adapted to apply cepstral analysis on the first seismic data to determine the time delay.

18. A method comprising:
obtaining first seismic data acquired by at least one seismic sensor; and
processing the first seismic data to determine a value indicative of a three-dimensional directional propagation attribute of a seismic event based on the first seismic data, comprising:
determining a two-dimensional angle of incidence of the seismic event;
determining an azimuth of the seismic event; and
determining a three-dimensional incidence angle based at least in part on the two-dimensional incidence angle and the azimuth.

19. The method of claim 18, wherein the seismic event comprises a first wave and a ghost wave formed from the first wave.

20. The method of claim 18, wherein the act of determining the two-dimensional angle of incidence comprises:
determining a time delay between coherent arrivals detected by two or more inline seismic sensors.

21. The method of claim 18, wherein the first seismic data indicates particle motion measurements acquired along two orthogonal horizontal axes, and the act of determining the azimuth comprises processing the first seismic data to perform polarization analysis on the particle motion measurements.

22. The method of claim 18, wherein the act of determining the azimuth comprises:
determining a first time delay between coherent arrivals detected by two or more inline seismic sensors of said at least one seismic sensor;
determining a second time delay between the same coherent arrivals by two or more crossline seismic sensors of said at least one seismic sensor;
processing the first and second time delays to determine corresponding first and second slowness components and a ratio of the two components of slowness; and
inverting the ratio for the azimuth.

23. A method comprising:
obtaining first seismic data acquired by at least one seismic sensor; and
processing the first seismic data to determine a value indicative of a three-dimensional directional propagation attribute of a seismic event based on the first seismic data, wherein the value indicates an azimuth of the seismic event, the first seismic data indicates particle motion measurements acquired along two orthogonal horizontal axes, and the act of processing the first seismic data comprises processing the first seismic data to perform polarization analysis on the particle motion measurements.

24. A method comprising:
obtaining first seismic data acquired by at least one seismic sensor; and
processing the first seismic data to determine a value indicative of a three-dimensional directional propagation attribute of a seismic event based on the first seismic data, wherein the value indicating an azimuth of the seismic event, and the act of processing the first seismic data comprises:
processing the first seismic data to determine a two-dimensional incidence angle; and
basing the determination of the value indicative of the azimuth at least in part on the determined two dimensional incidence angle and the determined three-dimensional incidence angle.

25. The method of claim 24, wherein the act of processing the first seismic data to determine the two-dimensional incidence angle comprises determining a time delay between coherent arrivals detected by two or more inline seismic sensors.

26. A system comprising:
an interface to receive first seismic data acquired by at least one seismic sensor; and
a processor to process the first data to determine a value indicative of a three-dimensional directional propagation attribute of a seismic event based on the first data, wherein
the three-dimensional directional propagation attribute comprises a three-dimensional angle of incidence of the seismic event, and
the processor is adapted to process the first data to determine an azimuth and a two-dimensional angle of incidence of the seismic event and base the determination of the three-dimensional incidence angle on the two-dimensional angle of incidence and the azimuth.

27. A system comprising:
an interface to receive first seismic data acquired by at least one seismic sensor; and
a processor to process the first data to determine a value indicative of a three-dimensional directional propagation attribute of a seismic event based on the first data, wherein
the value indicates an azimuth of the seismic event, and
wherein the first seismic data indicates particle motion measurements acquired along two orthogonal horizontal axes, and the processor is adapted to process the first seismic data to perform polarization analysis on the particle motion measurements to determine the value indicative of the azimuth.

28. The system of claim 27, wherein the processor is adapted to:
process the first seismic data to determine a two-dimensional incidence angle; and
base the determination of the azimuth on the determined two dimensional incidence angle and the determined three-dimensional incidence angle.

29. The system of claim 28, wherein the processor is adapted to determine a time delay between coherent arrivals detected by at least two or more inline seismic sensors of said at least one seismic sensors to determine the two-dimensional incidence angle.

* * * * *